United States Patent [19]

Treadaway, Sr.

[11] Patent Number: 5,055,191
[45] Date of Patent: Oct. 8, 1991

[54] SUBSTANCE SPILL PICK-UP DEVICE

[76] Inventor: James E. Treadaway, Sr., 2021 Emeralda Dr., Orlando, Fla. 32808

[21] Appl. No.: 384,168

[22] Filed: Jul. 24, 1989

[51] Int. Cl.$^5$ ............................................. B01D 17/02
[52] U.S. Cl. .................................. 210/242.3; 210/923
[58] Field of Search ................. 37/71, 264; 210/242.3, 210/242.4, 249, 776, 923; 114/255, 337

[56] References Cited

U.S. PATENT DOCUMENTS

| | | | |
|---|---|---|---|
| 3,804,177 | 4/1974 | Renfroe | 210/242.3 |
| 3,980,559 | 9/1976 | Netzell | 210/923 |
| 4,116,007 | 9/1978 | Stagemeyer et al. | 210/242.3 |
| 4,360,430 | 11/1982 | Ellis | 210/242.3 |
| 4,365,575 | 12/1982 | Cicero | 114/255 |
| 4,713,896 | 12/1987 | Jennens | 114/337 |

FOREIGN PATENT DOCUMENTS

| | | | |
|---|---|---|---|
| 1029964 | 4/1978 | Canada | 37/71 |
| 6939854 | 1/1972 | France | 210/242.3 |
| 52-5179 | 1/1977 | Japan | 210/242.3 |
| 53-14461 | 2/1978 | Japan | 210/242.3 |

*Primary Examiner*—Robert A. Dawson
*Assistant Examiner*—Joseph Drodge

[57] ABSTRACT

This invention relates to the clean-up, by boat or other water vessel, of oil, other chemicals or substances which float on top of or near the surface of the water. This clean-up action occurs when the boat or vessel is moving at a sufficient forward rate to cause the substance on the surface to be picked up and deposited in containers within the boat or vessel. The invention comprises a two-piece attachment bracket for the scoop structure; a scoop device which is built in two sections and is assembled on to the attachment brackets; hoses which carry the substance from the end of the scoop device to containers within the boat or other water vessel; a lifting device for the scoop structure; an opening and closing device for the aperture plate at the front of the scoop. The attachment brackets are assembled on the boat or other water vessel using a connecting pin in front and two straps which buckle in the rear of the boat or other water vessel. Brackets on each side of the boat or other water vessel are used as holding devices for the delivery hoses while the scoop is in use. A filler adapter is used, where necessary, to assure a snug fit of the scoop device against the boat or other water vessel hull.

1 Claim, 3 Drawing Sheets

26

28
27 a    b
29

12
30

1

SUBSTANCE SPILL PICK-UP DEVICE

TECHNICAL FIELD

This invention relates to the clean-up of oil or other substance spills which float on or near the surface of water. It can be readily assembled to any boat or other water vessel.

BACKGROUND ART

There are no scooping devices known to the inventor which can be used effectively to clean up oil or other substance spills. A critical need presently exists because of the severe damage now being done to beaches and more importantly marine life.

DISCLOSURE OF THE INVENTION

This invention provides superior advantages over presently used clean-up technology. This can be realized by examination of the drawings and associated descriptions. The invention comprises a two-piece attachment bracket for the scoop structure; a scoop device which is built in two sections; and is assembled on to the attachment brackets; hoses which carry the substance from the end of the scoop device to containers within the boat or other water vessel; a lifting device for the scoop structure; an opening and closing device for the aperture plate at the front of the scoop. The attachment brackets are assembled on the boat or other water vessel using a connecting pin in front and two straps which buckle in the rear of the boat or other water vessel. Brackets on each side of the boat or other water vessel are used as holding devices for the delivery hoses while the scoop is in use. A filler adapter is used, where necessary, to assure a snug fit of the scoop device against the boat or other water vessel hull.

Also the invention utilizes standard materials and shapes. Thus, making the scoop device economical to build and easy to assemble.

DETAILED DESCRIPTION OF THE INVENTION

Figure 1:
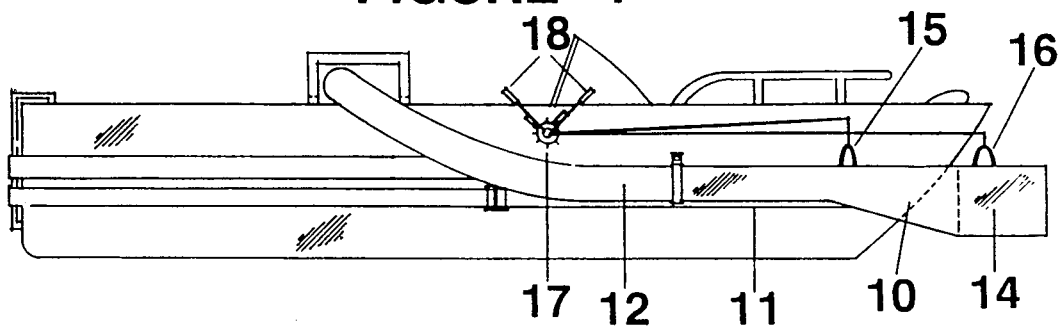
FIG. 1 is a side view of the various elements of an embodiment of the invention, shown attached to a vessel, such as a boat.
Figure 3:
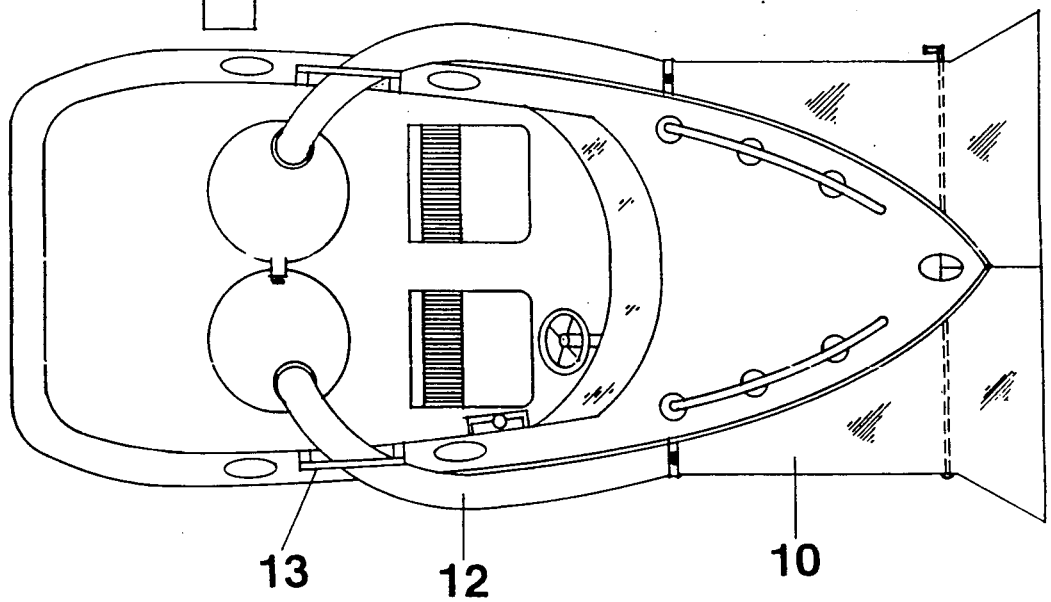
FIG. 3 is a top view of the various elements of the invention, with lifting devices omitted to reduce clutter.

FIGS. 1 and 3 show a scoop device 10 in accordance with the principles of the invention. The scoop device employs an attachment bracket 11 for attaching the scoop device; flexible tubing 12 which connects to the scoop device for the delivery of the contents to the containers located in the boat or other water vessel; an aperture section 14 with a movable plate which is intended to permit entry of the primary fluid into the scoop device; lifting devices 15 and 16 which raise and lower the scoop device 10 and the aperture plate 14; and a sprocket-like device 17 with spring loaded locking mechanisms 18 which maintain the scoop and aperture plate in the desired positions. The insides of the attachment brackets are covered with a ¼" rubber pad to prevent possible damage to the boat or other water vessel.

Figure 2:
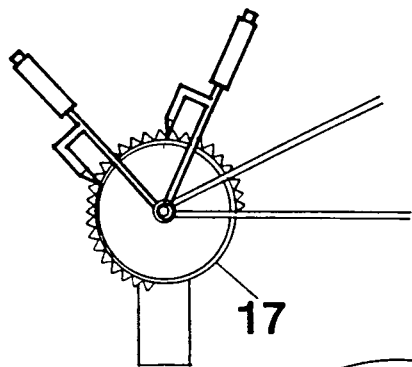
FIG. 2 is a more detailed view of the lifting devices for the scoop and aperture plates shown in FIG. 1.

FIG. 2 shows an expanded view of the sprocket locking device 17. The sprocket locking device may be made of steel or other suitably hardened material.

FIG. 3 shows how the scoop device 10 and tubing 12 are joined together, how the tubing delivers the picked up substance to the containers, and how the tubing is bracketed as indicated at 13 to the boat or other water vessel during use. The scoop device 10 is made of metal, plastic or other suitable material and can be formed, welded, or otherwise joined together. The tubing 12 will vary in size depending on the size of the scoop and the vessel to which it is attached. It is made of rubber, plastic or other suitable material. The tubing securing bracket 13 is made of metal, plastic or other suitable material. It will vary in size depending upon the size of the vessel and attaches underneath the gunnels.

Figure 4:
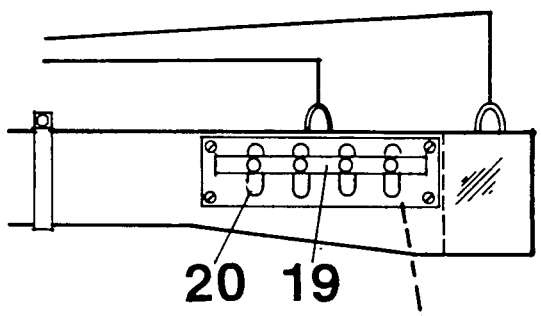
FIG. 4 is an inside view of one side of the scoop element of the embodiment of FIG. 1.

FIG. 4 depicts the attaching scoop bracket 19 which is welded or otherwise affixed to the scoop device. The bracket has vertical slots in which the parallel member 20 moves up and down. The bracket is made of metal, plastic or other suitable material.

Figure 5:
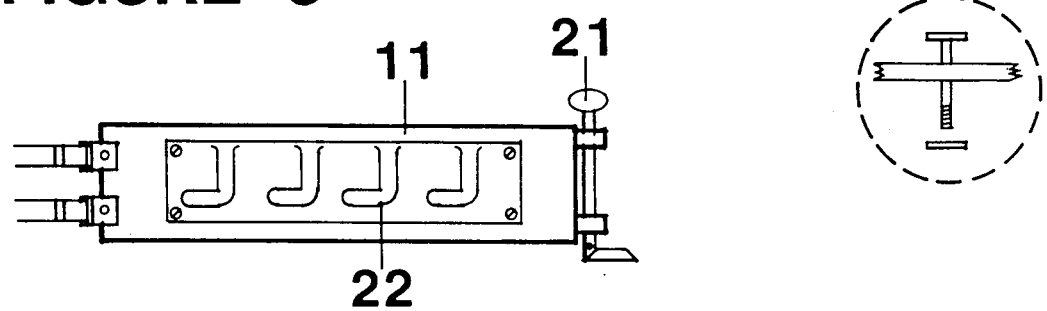
FIG. 5 is a side view of the attachment bracket which the scoop element fits into.

FIG. 5 shows the vessel attachment bracket 11 and how it is designed to accept the scoop device and is pinned 21 to the bracket on the opposing side. The slots 22 in the bracket are designed such that no upward or downward movement of the scoop device can take place without actuating the sprocket locking device. Meanwhile, allowing a snug fit between the scoop device, the tubing and the attachment bracket. The bracket can be made of metal, plastic or other suitable material. The pinning device is designed for quickly adjoining the bracket devices. It has a locking swivel tip and can be constructed with suitable hardened materials.

Figure 6:
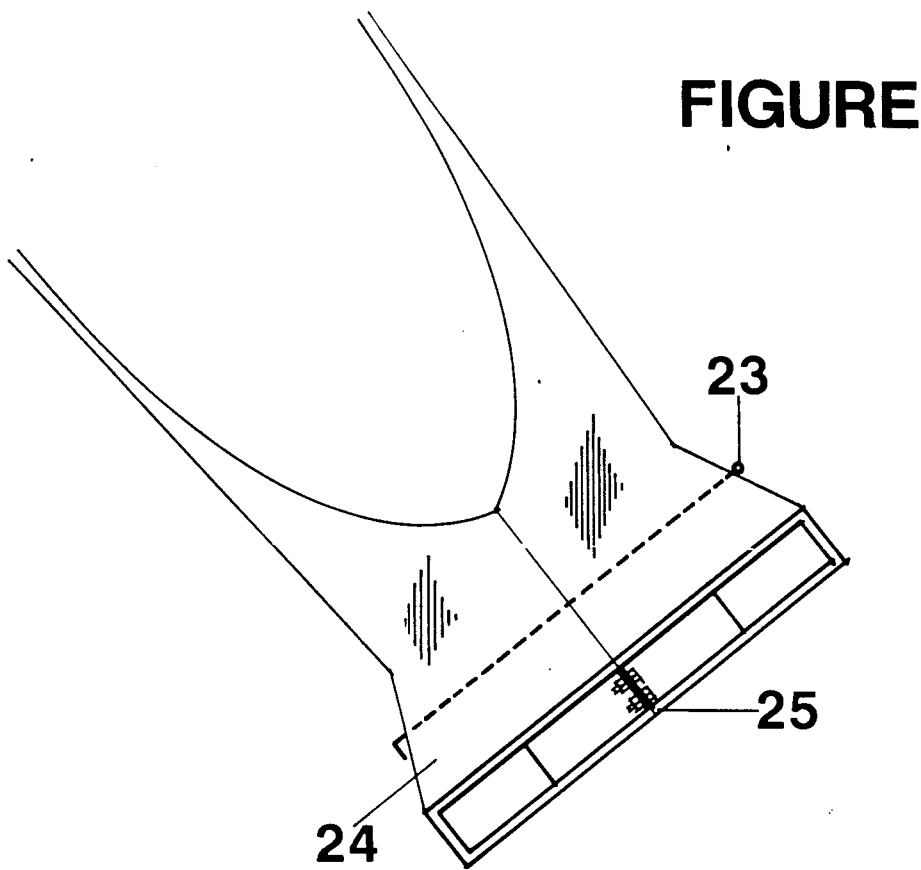
FIG. 6 is a perspective view showing how the two scoop elements fit together.

FIG. 6 shows the hinge 23 for the aperture plate 24. The plates move up and down to permit entry of the primary substance while minimizing the entry of water. The aperture plates are made of the same material as the scoop device. The hinge pin is a standard ¼" pin with a swivel lock tip for ease of installation.

Figure 7:
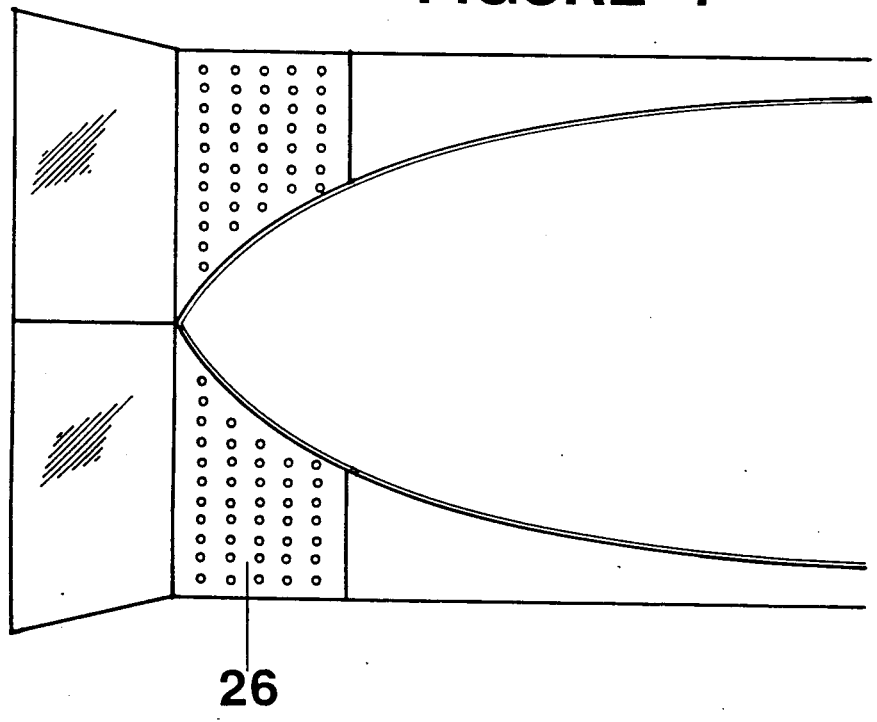
FIG. 7 shows the bottom sides of the scoop elements, illustrating perforations for releasing water.

FIG. 7 shows the perforated sections 25 on the bottom of the scoop device. The purpose of this section is to release water as the primary substance passes over. This section is integral to the scoop device.

Figure 8:
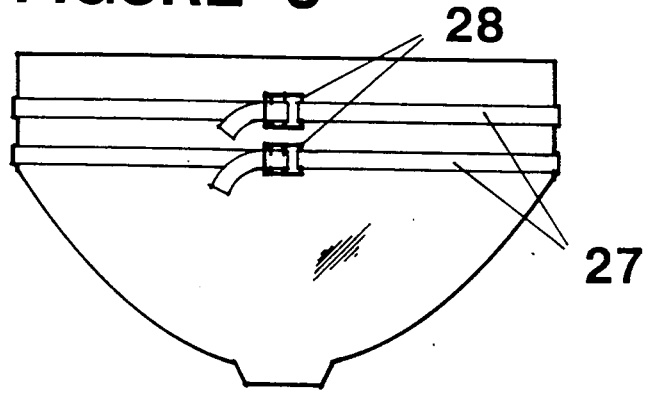
FIG. 8 is a view of the rear of the boat, showing how the attachment bracket is secured.

FIG. 8 depicts how the attachment bracket on the front of the scoop device is secured to the boat or other water vessel. Securing is accomplished through the use of standard webbed belts and buckles. The straps 26 are made of nylon webbing material. The buckles 27 are made of brass to resist corrosion.

Figure 9:
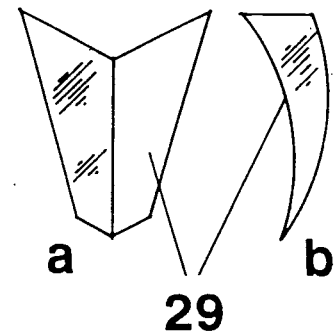
FIGS. 9a and 9b are front and side views, respectively, showing a typical adapter device for attaching the bracket to the hull.

FIGS. 9a and 9b show a front view and a side view of the adapters 28. The adapters are used as needed to insure a snug fit to the bow of the scoop vessel. They will come in several different sizes. They will be made of rubber or other suitable material.

Figure 10:
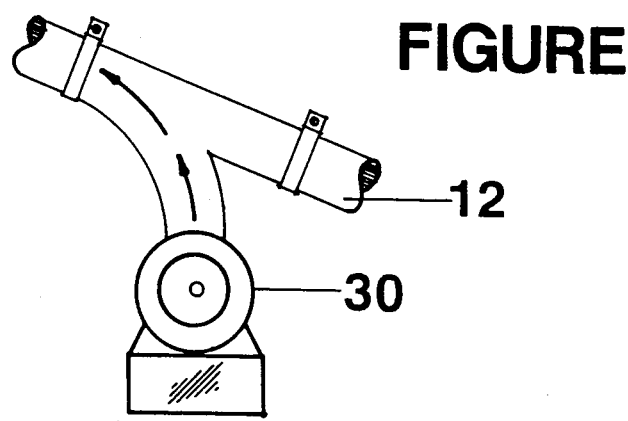
FIG. 10 is a side view of an air turbine which may be useful, on large boats or other water vessels, to improve the capillary or vacuum action effect.

FIG. 10 shows a standard 110 Volt air turbine 29 for use on larger boats or vessels. The turbine is clamped to the tubing 12 for increasing the capillary-like effect of the vessel moving forward.

What is claimed is:

1. A scoop device for attachment to any size boat or other water vessel for skimming oil or other substances which float on or near the surface of a body of water comprising:
   (a) a scoop device being built in two scoop sections with each of said sections having respective rear and front portions and having chambers, the scoop device also having an aperture plate adjacent said front portions;
   (b) attachment bracket means including a connecting pin and straps to secure said sections to a rear portion of a vessel;
   (c) said sections being assembled onto the attachment bracket and being bolted together at adjacent locations of said front portions;
   (d) means including hoses or tubes for attachment from a sections to said vessel and for delivery of skimmed substance from a body of water to containers located within said vessels;
   (e) means for lifting said sections from a position in said body of water to a position out of said body of water;
   (f) means for opening and closing said apertured plate so as to control an amount of substance skimmed from said body of water and entering said chambers;
   (g) said scoop sections each including perforated section means for allowing water to escape from said skimmed substance prior to delivery of said substance to said vessel and
   (h) an air turbine fluidly connected with said means for delivery.

* * * * *